March 19, 1963  V. L. CARISSIMI  3,082,309
WIRING DEVICE FOR CONTROLLING CIRCUIT CONTINUITY
Filed Aug. 21, 1959  2 Sheets-Sheet 1
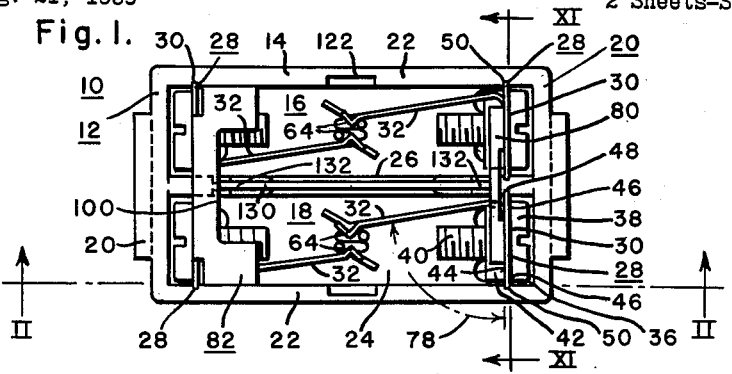
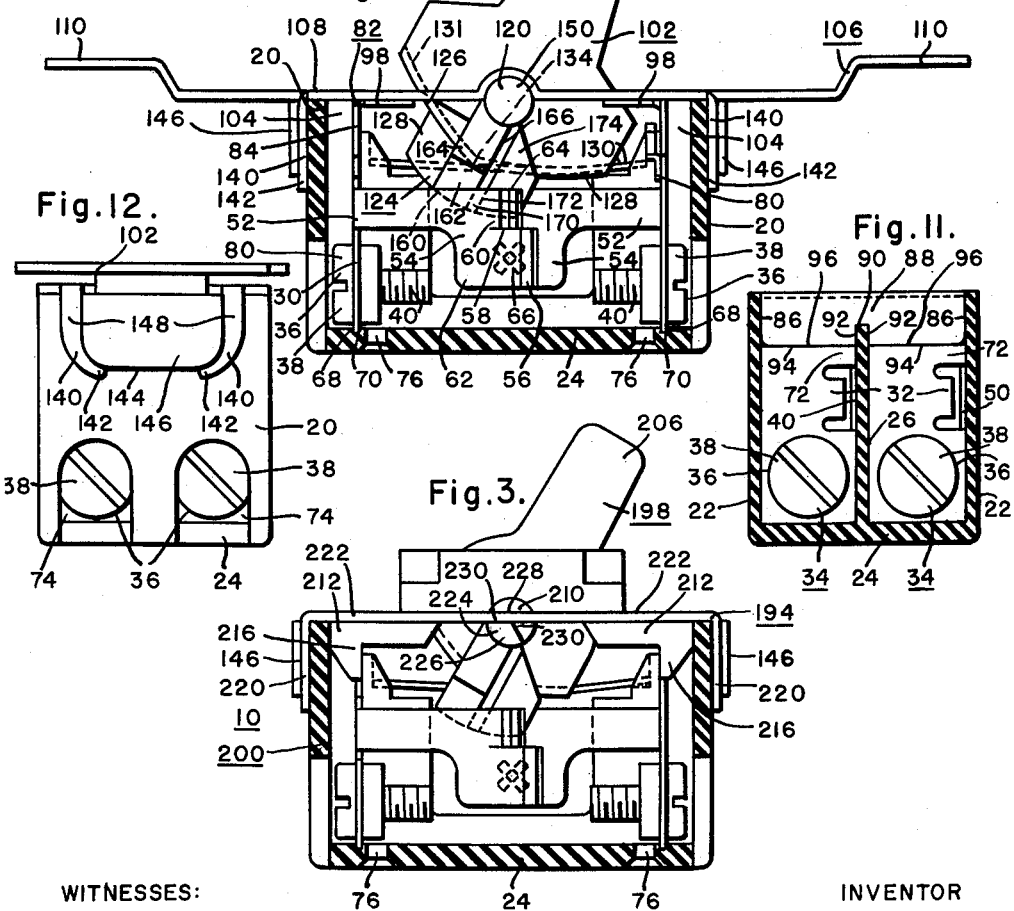
WITNESSES:
Wm. La Groome
Edward F. Possessky
INVENTOR
Vincent L. Carissimi.
BY
Donald Smith
ATTORNEY March 19, 1963   V. L. CARISSIMI   3,082,309
WIRING DEVICE FOR CONTROLLING CIRCUIT CONTINUITY
Filed Aug. 21, 1959   2 Sheets-Sheet 2

United States Patent Office 3,082,309
Patented Mar. 19, 1963

3,082,309
WIRING DEVICE FOR CONTROLLING
CIRCUIT CONTINUITY
Vincent L. Carissimi, Fairfield, Conn., assignor to The Bryant Electric Company, Bridgeport, Conn., a corporation of Connecticut
Filed Aug. 21, 1959, Ser. No. 835,223
4 Claims. (Cl. 200—153)

The present invention relates to electrical wiring devices and more particularly to wiring devices that are constructed for controlling the continuity of electrical circuits.

To create a combination of physical elements for use as a wiring device of the more particular type indicated above, it is necessary to correlate a number of technological and economic factors. As a general observation, such a combination of physical elements is required to provide desired operational results with an acceptable durability of operation and with an economy of construction that is improved over that of conventional combinations.

More particularly, the function of controlling the continuity of an electrical circuit is conventionally provided in a wiring device through the use of a pair of conductive portions which, when engaged with each other, provide circuit continuity, and, when spaced or disengaged from each other, provide circuit discontinuity. The conductive portions, of course, form a part of the combination of physical elements comprising the wiring device and are related to the combination in a manner that provides unitary operation for the wiring device.

Of the technological factors to be considered in creating the combination of physical elements, one having considerable significance is the distance to be provided between the conductive portions when positioned in spaced relation with each other. Bearing upon the creation with equal if not more significance is the force-time function to be employed in effecting engagement and disengagement of the conductive portions, in order to define as acceptable functions of time and distance the speed and the acceleration with which the engagement and the disengagement of the conductive portions are accomplished.

Furthermore, after full consideration of these and other technological factors, the creation of a wiring device for commercial acceptance requires full consideration of prescribed economic factors so that the combination of physical elements forming the wiring device provide, as noted previously, for an economy of construction and a durability of operation. Thus, for example, it is desirable that dimensional tolerances, bearing upon costs as an economic factor, be minimized in effect upon the construction of the wiring device in order that mass production of the device can be facilitated to afford attendant cost savings.

In the perspective of the general remarks thus far set forth, the invention will be better understood.

Thus, it is an object of the invention to provide a wiring device of economic construction and of improved operating character.

It is another object of the invention to provide a wiring device of economic construction and having an improved arrangement of physical elements for controlling the continuity of an associated electrical circuit.

It is a further object of the invention to provide a wiring device of economic construction occasioned by factors including a simplification of assembly and a reduced effect of dimensional tolerances upon operational intetgrity and having a combination of physical elements including a pair of movable brush members, respectively, bearing conductive portions that can be engaged or disengaged through actuation of the brush members to provide improved control of the continuity of an associated electrical circuit.

These and other objects of the invention will become more apparent upon consideration of the following detailed description of an illustrative embodiment of the invention as related to the attached drawings, in which:

FIG. 1 is a top plan view of a wiring device having certain portions removed and being constructed in accordance with the principles of the invention.

FIG. 2 is an elevational view of the wiring device shown in FIG. 1, taken along the line II—II thereof, with the removed portions being provided here according to one arrangement of the invention.

FIG. 3 is an elevational view of the wiring device shown in FIG. 1 taken along the line II—II with the removed portions thereof and other portions being provided here according to a second arrangement of the invention.

FIG. 11 is a sectional view of the wiring device shown in FIG. 1 taken along the line XI—XI, with a second insulating member assembled therewith.

FIG. 12 is an end view of the wiring device that is shown in FIG. 2 and that is shown here with the actuator removed.

Figure 4:
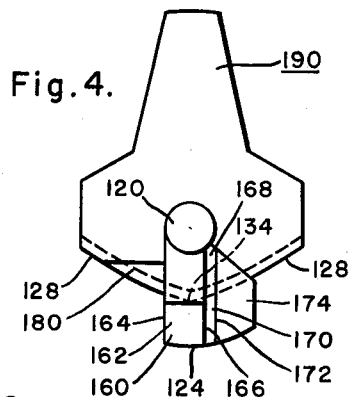
FIG. 4 is an elevational view of a modified actuator for use with the wiring device shown in FIG. 2.
Figure 5:
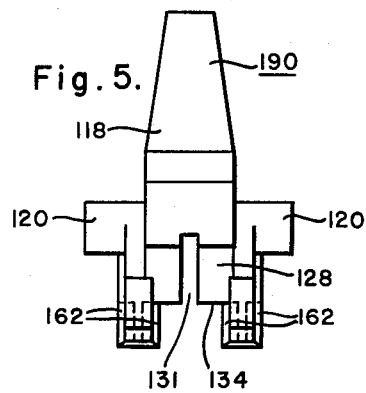
FIG. 5 is an end elevational view of the actuator shown in FIG. 4.

Through an application of the broad principles of the invention, consistent with the previous remarks, a wiring device comprises operative elements interrelated in a manner such that an economy and a facility of construction are provided for the wiring device and such that technologically desired functional features are provided for the wiring device. When the principles of the invention are used to construct a wiring device that controls the continuity of an electrical circuit, the combination of physical elements can include a pair of resiliently supported contact portions that can be operated between engaged and disengaged positions in a manner such that practical dimensional tolerances of the elements of the combination are, for the most part, nonadditive in effect upon the operation. To set forth more clearly the fundamental precepts of the invention, the illustrative embodiment of the invention shown in the attached drawings will now be described, with the understanding that the description is not to be limitative of these precepts.

With reference to FIGS. 1 and 2, a wiring device 10 or a switch 12 that is to be used for controlling the continuity of an electrical circuit (not shown) is provided with a combination of physical elements of which one element is a member 14 for housing other operative elements. The housing member 14 can be molded as a unitary element through the use of any suitable insulating material.

More particularly, the housing member 14 is provided with adjacent chambers 16, 18 bounded by end walls 20 and side walls 22 and a base wall 24 and separated by a partition wall 26 that is extended longitudinally between the end walls 20. A pair of terminal members 28 can be supported in each chamber 16, 18 to provide for operation of the switch 12 in a manner to be described subsequently. Additionally, other structural features are provided for the housing member 14 for reasons which will become evident hereinafter.

To describe the terminal members 28 more specifically, with reference also to FIG. 11, it is to be noted in the first place that each terminal member 28 is provided with a portion 30 for engaging a power conductor (not shown) and also with an elongated arm portion 32, here in a cantilever relationship with the conductor engaging portion 30, for controlling the continuity of the aforementioned electrical circuit of which the conductor engaged by the conductor engaging portion 30 is a part.

As implied, means 34 for engaging a conductor are provided on the conductor engaging portion 30. With continued reference to FIGS. 1 and 11, the means 34 employed here include a fastener or screw 36 that is passed through an opening in the portion 30 so that a head 38 of the screw 36 is positioned on an outer side of the portion 30 and a shank 40 of the screw 36 is engaged with a nut 42 adjacent to an inner side 44 of the portion 30. To provide for support of the portion 30 in the housing member 14, and thus for support of the terminal member 28 which is unitary here, wing sections 46 of the portion 30 are suitably disposed for guided reception in upstanding grooves 48 located in the partition wall 26 and upstanding grooves 50 oppositely located in each of the side walls 22 of the housing member 14.

The circuit controlling arm or arm portion or the brush portion 32 of the terminal member 28 is extended angularly from the plane of the conductor engaging portion 30. An inner section 52, as viewed in FIG. 2, of the brush portion 32 is preferably relatively narrow to provide space, as measured in the upstanding direction, for positioning the nut 42 in a manner subsequently to be described more fully. However, the preferred cross-sectional area of the inner section 52 of the brush portion 32 is, of course, sufficient to provide whatever current carrying capacity is required for operation of the switch 12.

An outer section 54 of the elongated brush portion 32 is somewhat wider than the inner section 52 and is provided with an outwardly flared end 56 for operational purposes to be described. The outer section 54 is partially split along its extended or the longitudinal direction, as indicated by the reference character 58, to be formed into an upper portion 60 and a lower portion 62 which are proximate to each other but displaced in the vertical direction of the drawing or in the lateral direction if the longitudinal direction of the elongated brush portion or arm 32 is used as a reference. That part of the flared end 56 which is extended from the upper portion 60 is compressed inwardly to provide a projection or cam 64 for facilitated actuation of the terminal brush portion 32.

The lower portion 62 of the outer section 54 is provided with means for establishing an electrical connection, in this instance in the form of a contact element 66. For economy purposes, the contact element 66 is comprised of a predetermined length of conductive wire, of a material such as silver, and is engaged with the lower portion 62 of the outer section 54 by any suitable process such as by welding. It is to be noted now that the wire contact element 66 is here disposed at an angle of approximately 45 degrees relative to the upstanding direction, as clearly observed in FIG. 2.

As a first step in the assembly of the switch 12, a pair of terminal members 28 can be inserted in opposing relation into the chamber 16 of the housing member 14. To perform this first step of the assembly, the wing sections 46 of each terminal member 28 are positioned for guided movement in the opposing grooves 48, 50 into the chamber 16. Each terminal member 28 will have been fully inserted in the housing member 20 when an end section 68 of the conductor engaging portion 30 is positioned in a groove 70 of the base wall 24 which is located in the plane of the opposing grooves 48, 50 of the partition wall 26 and side walls 22, respectively. It is manifest, therefore, that the fully inserted terminal members 28 are supported against all displacement forces except those directed outwardly of the housing member 14 along the path of insertion of the terminal members 28.

Additionally, the wing section 46 on the side of the terminal member 28 from which the brush portion 32 is angularly extended from the conductor engaging portion 30 is discontinuous along its height as a result of the brush portion 32, being integral with the conductor engaging portion 30, having been deformed from the plane of the conductor engaging portion 30. Thus, an upper part of the wing section 46 just referred to is formed by a tab 72 which is positioned in an adjacent groove 48 of the housing member 14. With the latter provision, added stability over what would otherwise exist is provided for the terminal member 28 when inserted in the housing member 14.

An opening or port 74 is provided in each end wall 20 to provide access to the head 38 of each of the screws 36, respectively. The port 74 is here limited in size so that the end wall 20 of the housing member 14 can retain or capture the adjacent screw 36 from removal through the port 74. The latter feature is most clearly viewed in FIG. 12. Additionally, spaced openings 76 are provided through the base wall 24 of the housing member 14 for passage of the aforementioned conductor(s) into the chamber 16 for engagement with the conductor engaging portion 30 of the terminal member 28 with the use of the assembly of the screw 36 and the nut 42.

As noted previously, the conductor engaging portion 30 of the terminal member 28 can be accorded a variety of forms other than the one indicated here. It follows, therefore, that a modified arrangement can be readily used in place of the assembly of the screw 36 and the nut 42, the openings 76 of the base wall 24, and the port 74 of the end wall 20 to provide means for engaging a conductor.

Several other notations are to be made at this point in the description. The nut 42 is sized, within tolerant dimensional values, to bridge the space as measured transversely between the side wall 22 and the partition wall 26 in the chamber 16 of the housing member 14. Thus, when the screw 36 is twisted in either a clockwise or a counterclockwise direction, the nut 42 is caused to advance along the length of the shank 40 of the screw 36 substantially without any longitudinal displacement of the screw 36 itself. Of course, the end of the shank 40 of the screw 36 can be staked to form a limit of travel for the nut 42.

With continued reference to FIG. 1, it is to be noted that when a pair of terminal members 28 are inserted in the chamber 16 of the housing member 14, the outer sections 54 of the inserted terminal members 28 are positioned oppositely from each other and bear against each other under the effect of bias forces generated by the brush portions 32. More specifically, the wire contact elements 66 of the outer sections 54 bear against each other and are relatively positioned so that the longitudinal axis of one of the wire contact elements 66 is displaced through a substantial angle, here approximately 90 degrees, from the longitudinal axis of the other wire contact element 66. It is to be emphasized that the wire contact elements 66 can be relatively positioned in angular relationships other than the depicted one. However, the illustrated angular relationship is one which is preferred since it ensures an effective electrical engagement between the wire contact elements 66.

Phrased in other words, if the wire contact elements 66 are positioned substantially in angular alignment, slight variations in the location of the wire contact elements 66 on the outer sections 54 of the terminal members 28, respectively, would effect substantial variations in the amount of confrontment or abutting surface area of the wire contact elements 66 and in the amount of force implementing the engagement of the wire contact elements 66. On the other hand, with use of the physical relationship between the wire contact elements 66 described here, even substantial variations, either angular or longitudinal or horizontal, in the location of the wire contact elements 66 on the terminal members 28, respectively, have insignificant effect upon both the amount of surface area of the wire contact elements 66 in abutting engagement and the amount of force with which the wire contact elements 66 are maintained in the engagement.

Of course, in the illustrative embodiment of the invention, the force with which the outer sections 54 of the terminal members 28 are biased toward one another is determined, in part, by the angle at which the brush portions 32 are extended from the conductor engaging portions 30 of the terminal members 28. The forces that occasion the engagement of the outer sections 54 of the terminal members 28 increase as an inverse function of the angle indicated by the reference character 78 (FIG. 1).

As indicated in FIG. 1, a pair of terminal members 28 can also be inserted in the chamber 18 in the manner just indicated in connection with the chamber 16. In such an instance, control for the continuity of a pair of electrical circuits can be provided, or, with the use of a conductive shunt member 80, what is known as three way operation in the control of a single electrical circuit can be provided.

Additional physical elements for completing the assembly of the wiring device 10 or the switch 12 and for affording a complete operation therefor, can be provided in a number of forms, of which some are shown in the drawings to point out particularly the broad principles of the invention. Thus, in the arrangement shown in FIGS. 1 and 2, a pair of insulating elements 82 can be engaged with the housing member 14 to prevent withdrawal of the terminal members 28 and to isolate electrically, in part, the terminal members 28 from the open side of the housing member 14.

Generally considered, each of the insulating elements 82 is formed in the shape of an L, as clearly viewed in FIG. 2, so that an upstanding leg 84 thereof is positioned for guidance in the opposing grooves 48, 50 the partition wall 26 and the side walls 22 in the housing member 14. More specifically, the upstanding leg 84 is provided with opposite end wings 86, as viewed in FIG. 11, for positioning the leg 84 in the grooves 50 of the side walls 22, respectively, and with a central portion 88 having a slot 90 with ears 92 adjacent thereto for positioning the leg 84 in the grooves 48 of the partition wall 26, respectively. Each insulating element 82 can therefore be guided in movement along the grooves 48, 50 into the housing member 14 until a leading edge 94 of the upstanding leg 84 of the insulating element 82 is advanced to a position to abut an upper edge 96 of the conductor engaging portion 30 of the associated terminal member 28.

A horizontally positioned leg 98 of the insulating element 82 being integrally formed with the upstanding leg 84, provides an insulated stop for limiting movement of any conductor that may be extended upwardly from the base wall 24 of the housing member 14. A U-shaped cutout 100 in the horizontal leg 98 of the insulating element 82 provides space for operation of an actuator 102 yet to be described. To provide central support for the insulating element 82 in the longitudinal direction of the housing member 14, the central portion 88 of the upstanding leg 84 of the insulating element 82 is engaged with an adjacent side of a portion 104 of the partition wall 26.

With the arrangement of FIGS. 1 and 2, the actuator 102 and a yoke or mounting member 106 can be assembled with the housing member 14 to form completely the switch 12. The yoke member 106 is an elongated element having a central portion 108, as viewed in FIGS. 2 and 11, for enclosing the upper or open side of the housing member 14 and for retaining the terminal members 28 and insulating elements 82 in the housing member 14. Extended outwardly from the central portion 108 of the yoke member 106 along its longitudinal direction are a pair of oppositely positioned ears 110 each having an opening 112 for passage of a fastener (not shown) for mounting the switch 12 on a suitable support (not shown). Additionally, if desired, what is known as a plaster ear 114 can be extended outwardly from each of the ears 112. An opening 116 in the central portion 108 of the yoke member 106 provides for movement of the actuator 102.

The actuator 102 is a unitary member being operable as a lever element and having a projecting portion or handle 118 to provide means for its operation in manual form. Oppositely positioned cylindrical projections 120, which are more conventionally termed trunnions, ar extended transversely from opposite sides of the handle 118. Each of the trunnions 120 is employed to provide rotary or pivotal support for the actuator 102 in a conformally shaped notch 122 located in each of the housing side walls 22. Additionally, a pair of knife portions 124 are extended downardly from the trunnions 120 to provide for establishing and interrupting an engagement of the outer sections 54 of the terminal members 28. When the actuator 102 is supported as described, the knife portions 124 extend into the chambers, 16, 18, respectively, for brushing movement relative to the brush portions 32 of the terminal members 28.

An underside 126 of the actuator 102 is provided with surfaces 128 that are extended upwardly and outwardly from the transverse centerline of the underside 126. A slot 131 is provided in the underside 126 of the actuator 102, along the full length of the sloping surfaces 128, for reception of a spring or index element 130, here in the form of resilient wire, that can be extended between oppositely positioned pockets 132 of the partition wall 26 in the housing member 14. With a use of the wire spring element 130, as preferred here, in toggle or overcenter forces can be employed for indexing the actuator 102 in either of two rotary positions. For example, as viewed in FIG. 2, the wire spring element 130 is engaged with the actuator 102 in the slot 131 along the sloping surfaces 128 of the actuator underside 126. Upon counterclockwise rotation of the actuator 102 from its depicted or one rotary position, a lowermost section 134 of the actuator 102 forces the wire spring element 130 downwardly. Of course, the wire spring element 130 responds with upward forces so that, when the actuator 102 rotates through the upstanding plane taken along the axis of the trunnions 120, further counterclockwise movement of the actuator 102 is impelled by the upward forces of the wire spring element 130 thereby indexing the actuator 102 in a second rotary position. Of course, the same relation holds when the actuator 102 is rotated in a clockwise direction from its second position to its one position.

For a fuller description of an invention related to an arrangement including means for providing a toggle action, such as the wire element 130, reference is made to a copending application of Vincent L. Carissimi and Owen L. Taylor, entitled Wiring Device, filed December 23, 1958, S.N. 782,588, and assigned to the present assignee.

When the actuator 102 is positioned in the housing member 14, the wire spring element 130, being engaged with the actuator underside 126 in the slot 131, is forced inwardly of the housing member 14 to be supported firmly in the pockets 132 by the partition wall 26. The yoke member 106 can subsequently be positioned over the upper or open side of the housing member 14, as previously described, to complete the assembly of the switch 12.

The yoke member 106 can be engaged with the housing member 14 through the use of a plurality of arms 140 that are extended outwardly from the central portion 108 of the yoke member 106. After positioning the yoke member 106 as described, each of the arms 140 is deformed downardly from the plane of the central portion 108 of the yoke member 106 by any suitable means, and, additionally, transversely of itself so that a hook-like end portion 142 is formed to engage an underside 144 of a projection 146 extended outwardly from each end wall 20 of the housing member 14. Thus, when each arm 140 is deformed as just indicated, the yoke member 106 is securely fastened to the housing member 14 in that the arms 140 are engaged with vertical sides 148 of the projections 146 and with the outer side of the end walls to secure the yoke member 106 against rotary or lateral forces in the plane of the yoke member 106 and, additionally the hook-like end portions 142 of the arms 140, are engaged with the underside 144 of the projections 146, respectively, to secure the yoke member 106 against withdrawal forces away from the plane of the open side of the housing member 14. The central portion 108 of the yoke member 106 is provided with upstanding notches 150 for securing the actuator 102 against withdrawal and to enable rotary movement of the actuator 102.

The operation of the switch 12 shown in FIGS. 1 and 2 will now be described. Since the yoke member 106 is securely held against the open side of the housing member 14, the actuator 102 is rotatably supported in the notches 122, 150. Accordingly, one of the knife portions 124 of the actuator 102 is extended downwardly into each chamber 16, 18 of the housing member 14 for brushing movement along the outer sections 54 of the terminal brush portions 32, as previously noted.

A front section 160 of each of the knife portions 124 is shaped in the form of a wedge so as to have beveled surfaces 162 that are inclined outwardly from a foremost edge 164 of the front section 162 to a rearmost edge 166 of the front section 162 for facilitating movement of the knife portions 124 between the brush portions 32 of the terminal members 28. Each knife portion 124 is also provided with a central section 168 having inclined surfaces 170 extended inwardly from the rearmost edge 166 of the front section 162 to a foremost edge 172 of a rear section 174 of the knife portion 124. The latter arrangement provides for indexing or stabilizing the brush portions 32 in disengaged relation with each other in a manner that will subsequently become more apparent. As noted previously, the actuator 102 can be indexed in either of two rotary positions, and in the one actuator position indicated in FIG. 2 the actuator knife portion 124 that is extended into the chamber 16 is located so that the outer sections 54 of the terminal members 28 in the chamber 16 are engaged with each other. It is to be noted that since a section 180 is broken away from the actuator underside 126 this one position of the actuator 102 can be maintained without interference between actuator 102 and the terminal member 28 having its brush portion 32 adjacent to the partition wall 26.

Rotary movement of the actuator 102 from this one position toward the other or second position then forces the knife portion 124, particularly the front section 160 thereof, to brush between the opposite brush portions 32 of the terminal members 28 in the chamber 16 thereby forcing a separation of the outer sections 54 and the wire contact elements 66 of the terminal members 28. It is to be noted that the brushing movement of the knife portion 124 relative to the brush portions 32 of the terminal members 28 in the chamber 16 is accomplished with a knife portion 124 of smaller width than would otherwise be necessary because of the use of the inwardly facing cams or projections 64 of the terminal brush portions 32.

As the knife portion 124 of the actuator 102 brushes between the terminal brush portions 32 in the chamber 16, the terminal outer sections 54 become more widely separated as a result of the outward inclination of the beveled sufaces 162 of the front section 160. When the actuator 102 has been rotated an amount such that the cams 64 abut the rearmost edge 166 of the front section 60, continued rotary movement of the actuator 102 to the other of the mentioned two rotary positions results in a rapid camming movement of the terminal cams 166 along the inwardly inclined surfaces 170 of the central section 168 to the rear section 174 of the knife portion 154 in response to increased bias forces of the terminal brush portions 32. Thus, an indexed relationship is also provided for the terminal brush portions 32 relative to the actuator 102 in the actuator second position, in which, of course, the terminal members 28 are disengaged. In addition, if the actuator 102 is released prior to advancing to the degree of rotary movement in which the terminal cams 64 abut the rear edge 166 of the actuator front section 160, the actuator 102 will be indexed back into its one rotary position and the terminal mmebers 28 will return to their former engaged position under the impetus of inherent bias forces. Conversely, if movement of the actuator 102 from its second position toward its one position is undertaken, and if the actuator 102 is then released prior to advancing to a degree of rotary movement in which the terminal cams 64 will have proceeded outwardly along the inclined surfaces 170 to the rear edge 166 of the actuator front section 160, the actuator 102 will be indexed back into its second rotary position and the terminal members 28 will return to their former position against the actuator rear section 174.

It is to be noted that, in the instance just described, the outer sections 54 of the terminal members 28 are disengaged from one another at a relatively low speed so that the switch 12 can be used in controlling the continuity of circuits in which alternating currents flow. The latter observation is based upon the fact that an ionized discharge path between the outer terminal sections 54 is readily deionized when the alternating voltage that impels the alternating current acquires a zero value if the path is relatively short.

On the other hand, when the actuator 102 is returned to its mentioned one position, the terminal cams 64 advance outwardly along the surfaces 170 and then inwardly along the beveled surfaces 162 of the front section 160 of the knife portion 124. Subsequently, as a result of bias forces generated in the brush portions 32 of the terminal members 28, the terminal outer sections 32 move toward one another with relatively great speed when the cams 64 pass over the foremost edge 164 of the actuator front section 160. However, because free movement of the terminal outer sections 32 toward one another does not occur until after the cams 64 have advanced beyond the foremost edge 164 of the actuator front section 160, at which point the distance between the terminal outer sections 32 is relatively small, oscillating movement or chatter of the terminal outer sections 32 relative to each other is virtually eliminated upon occurrence of their free movement toward a mutually engaged position.

Since the arrangement shown in FIGS. 1 and 2 comprises a single-pole, double-throw or, more conventionally, a three-way switch, the knife portion 124 extended into the chamber 18 is reversed in a longitudinally offset position relative to the knife portion 124 that is extended downwardly into the chamber 16. Thus, when the actuator 102 is in its one position wherein the terminal members 28 in the chamber 16 are engaged with each other the actuator knife portion 124 that extends into the chamber 18 also maintains a disengagement of the terminal members 28 in the chamber 18. Of course, when the actuator 102 is rotated to its other or second position, the terminal members 28 in the chamber 16 become disengaged, as previously noted, while the terminal members 28 in the chamber 18 become engaged.

In place of a single-pole double-throw or three-way switch, a double-pole single-throw switch can be provided as noted previously through removal of the conductive shunt member 80. In such an instance, the arrangement of physical elements for the switch 12 of FIG.

2 would otherwise be the same except that in place of the actuator 102 another actuator 190 of the type shown in FIG. 4 would be used. The actuator 190 is similar to the actuator 102 shown in FIG. 2 with the exception that the knife portions 124 are identically positioned on the opposite sides of the actuator 190. With this being the case, the terminal members 28 in each of the chambers 16, 18 are mutually engaged, respectively, when the actuator 190 is in its one rotary position, and, when the actuator 190 is in its second rotary position, the terminal members 28 in each of the chambers 16, 18 are disengaged, respectively.

To this point in the description, several arrangements of elements for combination with the terminal members 28 and the housing member 14, as viewed in FIG. 1, have been set forth. In place of the insulating elements 82 and the yoke member 106 of FIG. 2, an insulating closure member 192, as viewed in FIGS. 3, 6 and 8, along with a yoke member 194, as viewed in FIGS. 3 and 7, or a yoke member 196, as viewed in FIG. 10, and an actuator 198, as viewed in FIG. 3, can be employed to form the wiring device 10 or a switch 200.

The closure member 192 is provided with a body portion 202 having a central opening 204 for passage of a handle 206 of the actuator 198 and suitably positioned notches 208 in which trunnions 210 of the actuator 198 can be pivotally supported. Additionally, portions 212 extended outwardly from the underside of the body portion 202 of the closure member 192 are provided for enclosing corresponding open portions of the open side of the housing member 14 and for supporting the closure member 192 in the housing member 14. Slots 214 are provided in the closure member portions 212 to provide for positioning the closure member 192 relative to the portion 104 of the partition wall 26 of the housing member 14.

When the closure member 192, along with the actuator 198, is inserted through the open side of the housing member 14, downwardly extended teeth 216 of the closure member abut the upper edge 96 of each of the terminal members 28 positioned in the housing member 14 thereby seating the terminal members 28 against withdrawal from the housing member 14. The yoke member 194, having a central opening 218 for passage of the body portion 202 of the closure member 192, can then be positioned over the closure member 192 and the upper side of the housing member 14. Outwardly extended arms 220 of the yoke member 194 can then be deformed downwardly for engagement with the housing projections 146 in a manner identical with that described in connection with the switch 12 shown in FIGS. 1 and 2. With the yoke member 194 secured to the housing member 14, end portions 222 of the yoke member 194 bear against the upper side of the closure member portions 212 to secure the closure member 192 and the terminal members 28 within the housing member 14.

The actuator 198 shown in FIG. 3 is similar to the actuator 102 shown in FIG. 2, with one difference residing in the fact that a projection 224 is extended longitudinally from each of the trunnions 210 for pivotal support of the actuator 198 relative to the yoke member 194 and the housing member 14. Thus, an arcuate portion 226 of each of the projections 224 can be pivotally supported in the notches 122 of the housing member side walls 22 and an apex portion 228 of each projection 224 can provide a pivotal axis for the actuator 198 relative to the yoke member 194. Each projection 224 is provided with surfaces 230 diverging from the apex portion 228 of the arcuate portion 228 to form a limit of pivotal movement of the actuator relative to the yoke member 194.

The actuator 198 is shown to have knife portions 124 similar to those of the actuator 190 shown in FIG. 4, but it is to be noted that the actuator 198 can also have longitudinally offset knife portions 124 like those of the actuator 102 shown in FIG. 2. Thus, the switch 200 shown in FIG. 3 can be provided with single-pole double-throw, single-pole single-throw, or double-pole single-throw operation in a manner similar to the previously described manner in which the switch 12 shown in FIG. 2 can be provided with these operations.

Figure 6:
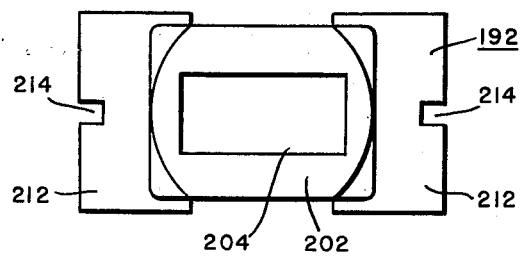
FIG. 6 is a top plan view of an enclosure member shown assembled with the wiring device in FIG. 3.
Figure 7:
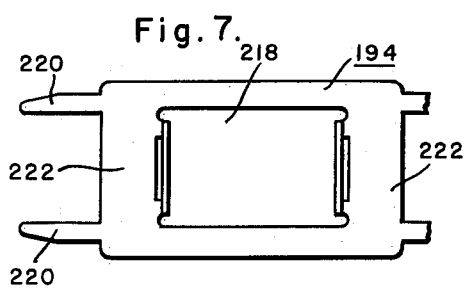
FIG. 7 is a top plan view of a mounting member shown assembled with the wiring device in FIG. 3.
Figure 8:
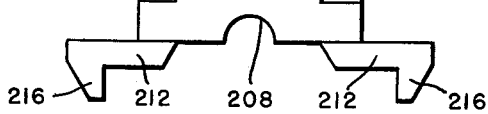
FIG. 8 is an elevational view of the enclosure member shown in FIG. 6.
Figure 9:
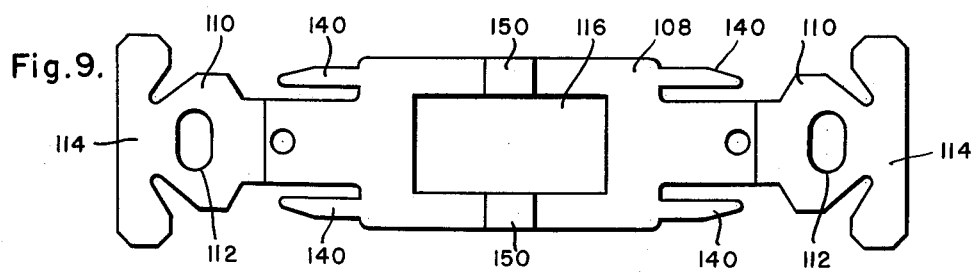
FIG. 9 is a top plan view of a mounting member shown assembled with the wiring device in FIG. 2.
Figure 10:
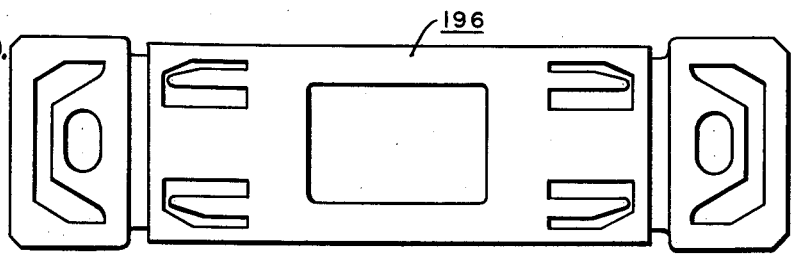
FIG. 10 is a top plan view of another mounting member that can be used with the wiring device shown in FIG. 3.

With a slight change in the configuration (not shown) of the body portion 202 of the closure member 192 of FIG. 6, particularly in the manner of dimension, the yoke member 196 shown in FIG. 10 can be used with the switch 200 shown in FIG. 3 in place of the yoke member 194 shown in FIG. 7. In such an instance, the yoke member 196 of FIG. 10 can be secured to the housing member 14 in the manner described in connection with the yoke members 194, 106 shown in FIGS. 7 and 9, so that the switch 200 can be maintained in a fully assembled relationship.

From what has been set forth in the preceding description, it is evident that the broad principles of the invention can be used to provide a variety of unitary wiring devices for a corresponding variety of commercial purposes. In addition, through slight modifications in the arrangement of physical elements, a variety of switches having respectively different types of operation can be provided. Thus, for any switch having a given type of operation, prescribed modifications in certain of the switch elements provide a variety of facings for the selected type.

Just as important as the latter notations are the technological factors that have been taken into consideration in the conception of the invention. Effective and durable control of the continuity of an electrical circuit is provided through the described means for effecting engagement and disengagement of contact portions which form a part of the electrical circuit.

As a final observation, it is to be reemphasized that an important economic advance in the wiring device art has been achieved through the minimization of the importance of manufacturing tolerances relative to the construction of a wiring device. To indicate more clearly what is meant with this observation, the character of separability of contact portions of a switch, in accordance with the principles of the invention, is primarily a function of certain dimensions of only two elements. Thus, with particular reference to the embodiments of the invention described herein, the cross-sectional dimension of the actuator knife portion 124 and the dimension of the distance between the opposing terminal brush portions 32, here between the terminal projections 64, are the only ones which, if varied beyond close limits would effect the integrity of the switch. Since the actuator 102, or 190, or 198 is a molded member with attendant accuracy of construction, the mentioned dimensional value of the distance between the opposing terminal brush portions 32 is the only one to be closely prescribed. Thus, dimensions of other elements of the switch are not cumulative to have an effect on the separability of the terminal members 28. Additionally, practical variations in vertical and horizontal displacement of the actuator have no effect on the separability of the terminal members 28.

The embodiments of the invention described and shown here are, as noted previously, intended to be illustrative and not limitative of the invention. Accordingly, it is desired that the invention be accorded an interpretation consistent with the scope and spirit of its broad principles.

What is claimed is:

1. A wiring device having suitable mounting means and comprising a hollow housing member, a pair of conductive terminal members, each of said terminal members having an elongated resilient arm, contact means secured to a first portion of each of said arms, means for supporting said terminal members in the hollow of said housing member and for urging said arms toward each other so that said contact means are normally mutually engaged, insulating means insertable between said arms to cam against respective other arm portions respectively located to one side of and in proximity to said first arm portions in the lateral direction of said arms thereby to urge both said other arm portions and said first arm portions apart so as to assure disengagement of said contact means, and means for securing a conductor to each of said terminal members.

2. A wiring device having suitable mounting means and comprising a hollow housing member, a pair of conductive terminal members, each of said terminal members having an elongated resilient arm, an elongated wire contact element secured to a first portion of each of said arms, means for supporting said terminal members in the hollow of said housing member and for urging said arms toward each other so that said wire contact elements are normally mutually engaged, the longitudinal direction of one of said wire contact elements being angularly disposed relative to the longitudinal direction of the other of said wire contact elements so that confrontment of said wire contact elements is ensured, insulating means insertable between said arms to cam against respective other arm portions respectively located to one side of and in proximity to said first arm portions in the lateral direction of said arms thereby to urge both said other arm portions and said first arm portions apart so as to assure disengagement of said wire contact elements, and means for securing a conductor to each of said terminal members.

3. A wiring device having suitable mounting means and comprising a hollow housing member, a pair of conductive terminal members, each of said terminal members having an elongated resilient arm, a contact element secured to a first end portion of each of said arms, means for supporting said terminal members in the hollow of said housing member and for urging said arms toward each other so that said contact elements are normally mutually engaged, each of said arms having a projection located on another end portion located to one side of and in proximity to said first arm end portion in the lateral direction of the associated arm, each of said projections extending toward the other projection with a predetermined spacing being provided between the facing ends of said projections when said contact elements are mutually engaged, insulating means brushingly insertable between said projections to urge both said other arm end portions and said first arm end portions apart so as to assure disengagement of said contact elements, and means for securing a conductor to each of said terminal members.

4. A wiring device having suitable mounting means and comprising a housing member having a pair of inner chambers, means for supporting a pair of conductive terminal members in each of said housing chambers, each of said terminal members having an elongated resilient arm, contact means secured to a first portion of each of said terminal arms, the associated contact means being normally urged into mutual engagement, a lever member being pivotally supported by said housing member and having a cam portion extending into each of said chambers for movement between the arms of the associated terminal members against respective other arm portions respectively located to one side of and in proximity to the associated first arm portions in the lateral direction of the associated arms thereby to urge both the associated other arm portions and the associated first arm portions apart so as to assure disengagement of the associated contact means, respectively and alternately, in accordance with the direction of pivotal movement of said lever member.

References Cited in the file of this patent

UNITED STATES PATENTS

| | | |
|---|---|---|
| 1,907,932 | Pugh | May 9, 1933 |
| 2,153,396 | Sambleson | Apr. 4, 1939 |
| 2,215,319 | Brown | Sept. 17, 1940 |
| 2,253,968 | Cook | Aug. 26, 1941 |
| 2,880,291 | Bussman | Mar. 31, 1959 |